L. WILLIS.
ROD ADJUSTING DEVICE.
APPLICATION FILED JAN. 29, 1908.
912,221.
Patented Feb. 9, 1909.
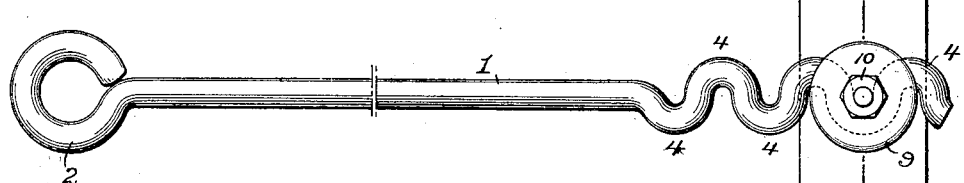
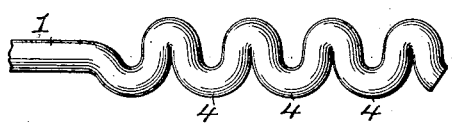
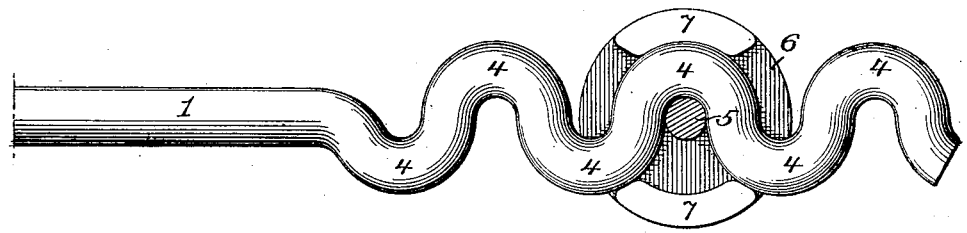
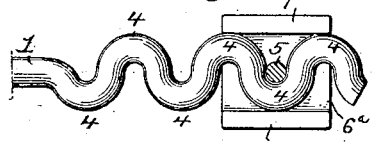
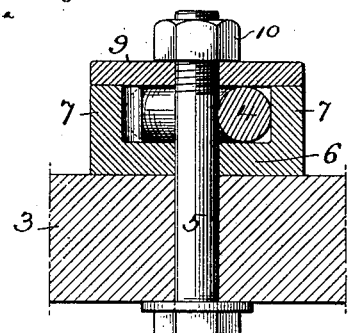
Witnesses
Hamilton T. Turner
Harry L. Smith
Inventor
Leland Willis
by his Attorneys
Smith & Frazier
THE NORRIS PETERS CO., WASHINGTON, D. C.

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

ROD-ADJUSTING DEVICE.

No. 912,221.     Specification of Letters Patent.     Patented Feb. 9, 1909.

Application filed January 29, 1908. Serial No. 413,316.

*To all whom it may concern:*

Be it known that I, LELAND WILLIS, a citizen of the United States, and a resident of Grenloch, New Jersey, have invented certain Improvements in Rod-Adjusting Devices, of which the following is a specification.

The objects of my invention are to provide a cheap, strong and simple rod-adjusting device; to prevent weakening of the rod by the formation of openings therein for the reception of the securing bolt; to permit of relatively fine adjustments of the rod; to relieve the securing bolt of a portion of the strain due to the pull or thrust of the rod thereupon, and to permit of any desired angular adjustment of the rod in respect to the fixed member to which it is confined without impairing the security of its connection with said member. These objects I attain in the manner hereinafter set forth, reference being had to the accompanying drawing, in which—

Figure 1 is a plan or top view of part of a rod with an adjusting device therefor constructed in accordance with my invention; Fig. 2 is a view of the device partly in plan and partly in horizontal section; Fig. 3 is a transverse section on the line *a—a*, Fig. 1; Figs. 4, 5, 6, and 7 are views illustrating modifications of my invention. Figs. 2, 3 and 7 are on a larger scale than Figs. 1, 4, 5, and 6.

In the drawing, 1 represents a rod, which may be provided at one end with an eye 2, or otherwise constructed for attachment to or engagement with any member of a machine which may have to be adjusted to different positions in respect to a normally fixed member, such, for instance, as the bar 3 shown in Figs. 1, 3 and 5. This bar may, for example, constitute one of the fixed bars of the frame of an agricultural implement, and the rod may be connected to a cultivator bar or other member of the machine whose adjustment to different positions in respect to the fixed member may be necessary at different times. That portion of the rod whereby the adjustment of the same is effected, is reversely bent or waved so as to form a succession of oppositely facing loops 4, any one of which may engage the bolt 5, whereby the rod is secured in place, said bolt being carried by the bar 3, and passing through a washer 6, bearing upon said bar and provided with opposite flanges 7, for bearing upon the outer portion of the loop which is in engagement with the bolt and retaining the rod in its proper lateral relation to said bolt, in order to prevent it from being disengaged therefrom, vertical displacement of the rod, so as to free it from engagement with these flanges, being normally prevented either by the nut 10 with which the bolt is provided, or by a cap plate 9 resting upon the tops of the flanges and confined in such position by said nut 10.

In order to effect readjustment of the rod, the nut 10 and cap plate 9 are removed and said rod is lifted so as to be free from engagement with the bolt 5 and flanges 7, whereupon it can be moved longitudinally in order to bring any other one of its loops 4 into engagement with the bolt and can be restored to position between the flanges 7 and there retained by reapplication of the cap plate and nut.

The flanges 7 are preferably of segmental form, in order that either of them may conform to the back of the loop which is in engagement with the bolt, the ends of that flange which is not thus in engagement bearing upon the members of the loop at the open end of the same, as shown in Fig. 2, whereby said flanges aid the bolt in resisting longitudinal thrust or pull upon the rod. While this is a preferable feature of my invention it is not absolutely necessary in all cases, as the washer may, if desired, have straight flanges, such, for instance, as shown at 7ª in Fig. 4, which will still perform the function of maintaining the engaging loop of the rod in its proper lateral relation to the bolt.

As the flanged washer 6 is capable of turning freely with or upon the bolt 5 it permits of any desired angular adjustment of the rod 1 in respect to the bar 3, or other fixed member of the machine, without in any way impairing the hold of the bolt upon the rod.

The bending or waving of the rod to form the successive loops for engagement with the retaining bolt provides for the desired longitudinal adjustment of the rod without any weakening of the same such as would be caused by the formation in it of openings for the reception of the securing bolt, and this method of construction also provides for a relatively fine adjustment of the rod, the successive positions of the latter being separated by a distance equal only to the diameter of the rod plus the diameter of the securing bolt. The provision of the rod with oppositely facing loops is, however, not essential to the broader embodiment of my invention, as the loops may, if desired, all face in the same direction, a rod thus constructed being shown in Fig. 6.

Instead of forming the flanges upon a washer employed in connection with a cap plate, as previously shown and described, said flanges may, in the case of a metal bar, be formed upon the bar itself, as shown for instance at 7ᵇ in Fig. 5, or, by reversing the washer 6, as shown in Fig. 7, the cap plate 9 may be dispensed with.

I claim:—

1. In a rod-adjusting device, the combination of a securing bolt, a rod having successive loops for engagement with said bolt, means for laterally retaining the engaging loop of the rod in such engagement, and means for preventing displacement of the rod in the direction of the axial line of that portion of the bolt which the rod engages.

2. In a rod-adjusting device, the combination of a securing bolt with a rod having successive oppositely facing loops for engagement with said bolt, and means for preventing lateral displacement of the rod when either of its loops is in engagement with the bolt.

3. In a rod-adjusting device, the combination of a securing bolt, a rod having successive loops for engaging said bolt, and means, also engaging the bolt, for preventing either lateral displacement of the rod or displacement of the same in the direction of the axis of that portion of the bolt which the rod engages.

4. In a rod-adjusting device, the combination of a securing bolt, with a rod having successive loops for engagement with the bolt, and retainers disposed on opposite sides of that portion of the bolt which engages the loop of the rod and each adapted to bear upon, and laterally retain the looped rod.

5. In a rod-adjusting device, the combination of a securing bolt, with a rod having oppositely-facing loops for engagement with the bolt, and opposed retainers, each adapted to bear upon and laterally retain that loop of the rod which is in engagement with the bolt, said retainers being curved to conform with the curve of the loop.

6. In a rod-adjusting device, the combination of a securing bolt, with a rod having successive loops for engagement with the bolt, and opposed retainers, one bearing upon the back of the loop which is in engagement with the bolt and the other bearing upon the members of the loop at the open end of the same.

7. In a rod-adjusting device, the combination of a securing bolt, a rod having successive loops for engagement with the bolt, and opposed retainers, each constructed either for bearing upon the back of the engaging loop and retaining it in such engagement, or for bearing upon the members of the loop at the open end of the same.

8. In a rod-adjusting device, the combination of a securing bolt, a rod having successive loops for engagement with the bolt, and opposed retainers, each constructed either for bearing upon the back of the engaging loop and retaining it in such engagement, or for bearing upon the members of the loop at the open end of the same, each of said retainers being also curved to conform to the curve of the back of the loop.

9. A rod-adjusting device comprising a securing bolt, a rod having successive loops for engagement with said bolt, a washer mounted upon the bolt and flanged to bear upon and laterally retain the loop which is in engagement with the bolt, and means for retaining the rod in engagement with said flanged portion of the washer.

10. A rod-adjusting device comprising a securing bolt, a rod having successive loops for engagement therewith, a washer mounted upon the bolt and flanged to bear upon and laterally retain the loop which is in engagement with the rod, and a cap plate for retaining the looped portion of the rod in engagement with said flanged portion of the washer.

In testimony whereof, I have signed my name to this specification, in the presence of two subscribing witnesses.

LELAND WILLIS.

Witnesses:
O. P. NEWCOMB,
E. E. WILSON.